United States Patent
Jang et al.

(10) Patent No.: US 12,457,088 B2
(45) Date of Patent: Oct. 28, 2025

(54) DEGRADATION TO REFERENCE SENSITIVITY

(71) Applicant: LG Electronics Inc., Seoul (KR)

(72) Inventors: Jaehyuk Jang, Seoul (KR); Suhwan Lim, Seoul (KR); Yoonoh Yang, Seoul (KR); Sangwook Lee, Seoul (KR); Jinyup Hwang, Seoul (KR); Jinwoong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/034,818

(22) PCT Filed: Oct. 21, 2022

(86) PCT No.: PCT/KR2022/016120
§ 371 (c)(1),
(2) Date: May 1, 2023

(87) PCT Pub. No.: WO2023/068863
PCT Pub. Date: Apr. 27, 2023

(65) Prior Publication Data
US 2023/0412353 A1    Dec. 21, 2023

(30) Foreign Application Priority Data
Oct. 22, 2021   (KR) .................. 10-2021-0141924

(51) Int. Cl.
*H04L 5/14* (2006.01)
*H04B 7/12* (2006.01)
*H04L 5/00* (2006.01)

(52) U.S. Cl.
CPC ............. *H04L 5/1461* (2013.01); *H04B 7/12* (2013.01); *H04L 5/006* (2013.01)

(58) Field of Classification Search
CPC ......... H04L 5/1461; H04L 5/006; H04B 7/12; H04B 1/3822; H04B 1/3833; H04B 1/385;
(Continued)

(56) References Cited

U.S. PATENT DOCUMENTS

2018/0091186 A1* 3/2018 Lim ...................... H04L 5/0037
2019/0158137 A1* 5/2019 Brunel ..................... H04B 1/04
(Continued)

FOREIGN PATENT DOCUMENTS

WO    WO 2020/201617    10/2020
WO    WO 2021/206475    10/2021

OTHER PUBLICATIONS

Notice of Allowance in Korean Appln. No. 10-2023-7012637, mailed on Feb. 24, 2025, 9 pages (with English translation).
(Continued)

*Primary Examiner* — Nizam U Ahmed
(74) *Attorney, Agent, or Firm* — Fish & Richardson P.C.

(57) ABSTRACT

There is provided a UE for performing communication, the UE comprising: at least one transceiver; at least one processor; and at least one computer memory operably connectable to the at least one processor and storing instructions that, based on being executed by the at least one processor, perform operations comprising: transmitting an uplink signal based on NR operating band n3; receiving a downlink signal based on the NR operating band n3.

11 Claims, 9 Drawing Sheets

(58) Field of Classification Search
CPC ....... H04B 1/50; H04B 17/203; H04W 52/42; H04W 52/367; H04W 52/265
See application file for complete search history.

(56) References Cited

U.S. PATENT DOCUMENTS

2022/0060262 A1\* 2/2022 Jana ................... H04L 25/0328
2022/0158801 A1\* 5/2022 Huang ................ H04W 52/367

OTHER PUBLICATIONS

Skyworks Solutions, Inc., "n3 PC2 MSD," R4-2114580, 3GPP TSG-RAN WG4 Meeting # 100e, Electronic Meeting, Aug. 19-27, 2021, 2 pages.
International Search Report and Written Opinion in International Appln. No. PCT/KR2022/016120, mailed on Jan. 27, 2023, 3 pages.
LG Electronics, "TP on Sensitivity analysis results and UE implementation for PC2 FDD band," 3GPP TSG-RAN WG4 Meeting # 100-e, R4-2112834, Electronic Meeting, Aug. 16-27, 2021, 8 pages.
ZTE Corporation, "Discussion on interference for HPUE FDD band," 3GPP TSG-RAN WG4 Meeting # 100-e, R4-2112911, Electronic Meeting, Aug. 16-27, 2021, 4 pages.
Skyworks Solutions, Inc., "n3 PC2 MSD," 3GPP TSG-RAN WG4 Meeting # 100e, R4-2114695, Electronic Meeting, Aug. 19-27, 2021, 3 pages.

\* cited by examiner

DEGRADATION TO REFERENCE SENSITIVITY

CROSS-REFERENCE TO RELATED APPLICATIONS

This application is a National Stage application under 35 U.S.C. § 371 of International Application No. PCT/KR2022/016120, filed on Oct. 21, 2022, which claims the benefit of Korean Patent Application No. 10-2021-0141924, filed on Oct. 22, 2021. The disclosures of the prior applications are incorporated by reference in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Conventionally, for power class 2 User Equipment (UE), the impact of self-interference on Frequency division duplex (FDD) band has not been analyzed.

Power Class2 RF requirements for NR FDD band is being discussed.

For the NR FDD band, only the Power class3 RF requirements existed. Therefore, it is necessary to analyze the requirements and develop technology in the Power Class2 band.

For example, the conventional FDD terminal (e.g. UE performing communication based on FDD bands) supports only Power class 3. However, recently, a discussion has begun on a Power Class2 FDD terminal with a 3 dB increase in transmit output compared to an existing Power class3 FDD terminal.

The power class 2 FDD terminal may transmit with an output 3 dB higher than that of the existing terminal. In this case, greater interference than the case of the conventional power class 3 terminal may come in the terminal's own reception frequency band. Therefore, it is necessary to analyze the interference effect on it. And, this amount of interference must be allowed so that the terminal can operate in the actual field.

Therefore, it is necessary to analyze the effect on self-reception sensitivity to an interference signal with MSD and define requirements that allow it.

SUMMARY

Accordingly, a disclosure of the present specification has been made in an effort to solve the aforementioned problem.

In accordance with an embodiment of the present disclosure, a disclosure of the present specification provides a UE for performing communication. The UE may be a power class 2 UE and may perform communication based on NR operating band n1 or n3. The maximum amount of degradation may be applied to reference sensitivity, based on the UE is the power class 2 UE.

According to a disclosure of the present disclosure, the above problem of the related art is solved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
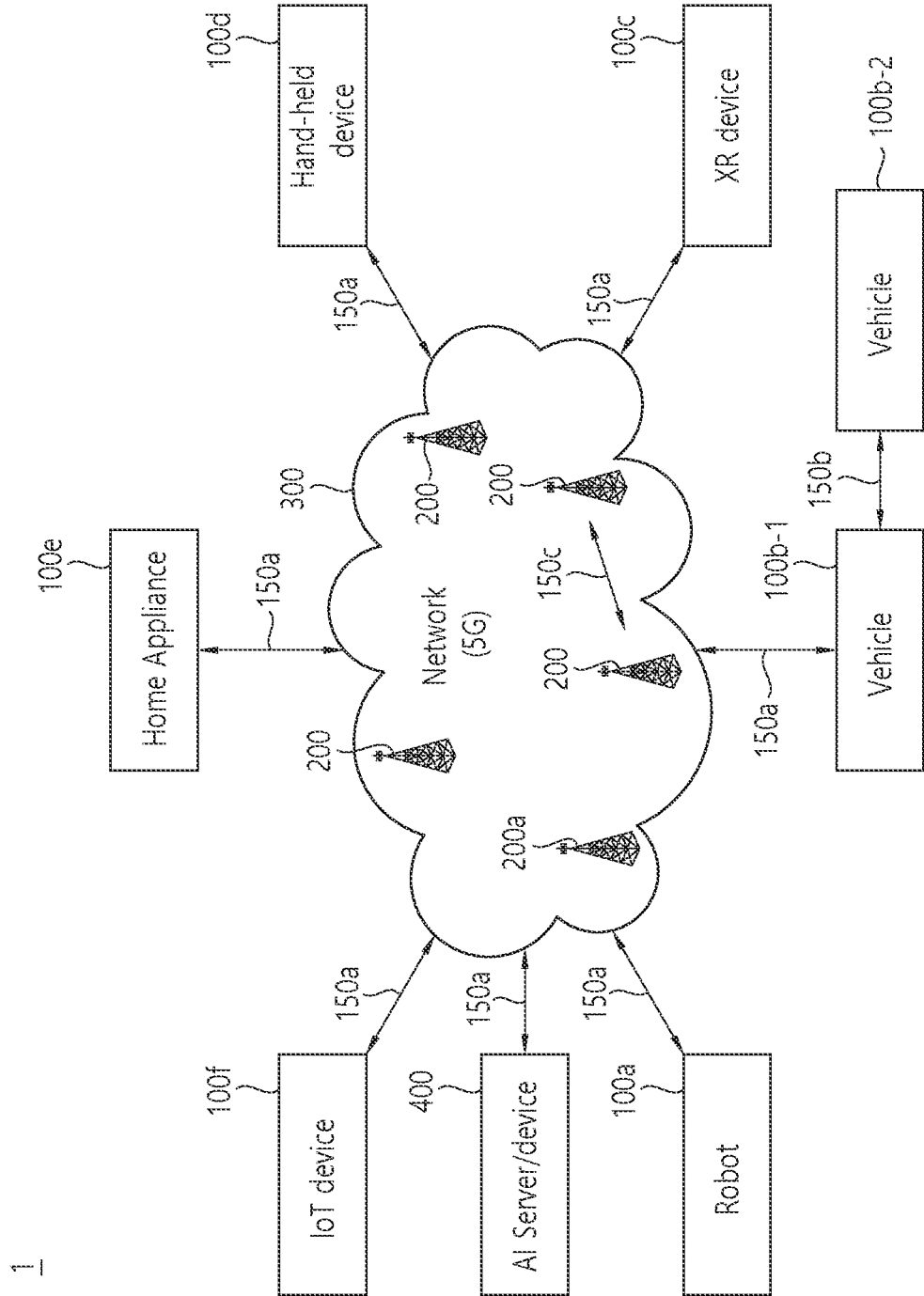
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application Wiring is high in installation and maintenance cost. Therefore, a possibility of replacing a cable with re-constructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
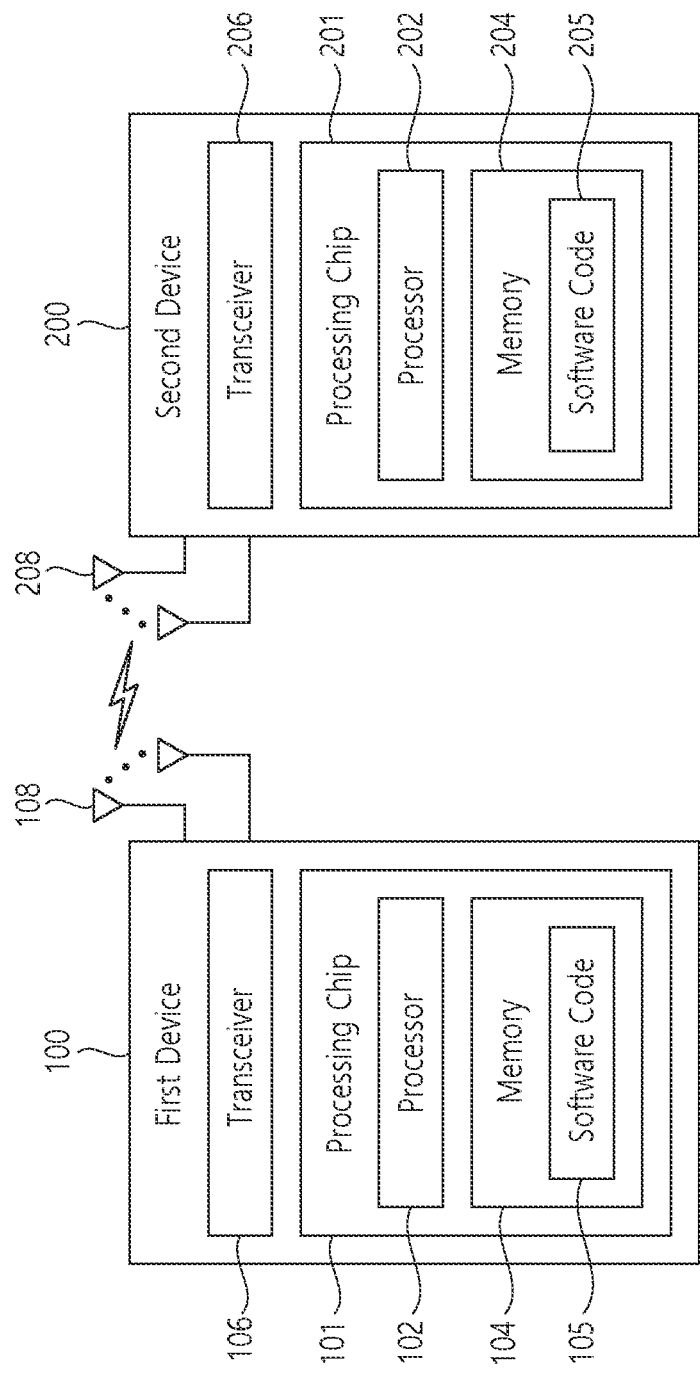
FIG. 2 shows an example of wireless devices to which implementations of the present disclosure is applied.

FIG. 2 Shows an Example of Wireless Devices to which Implementations of the Present Disclosure is Applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
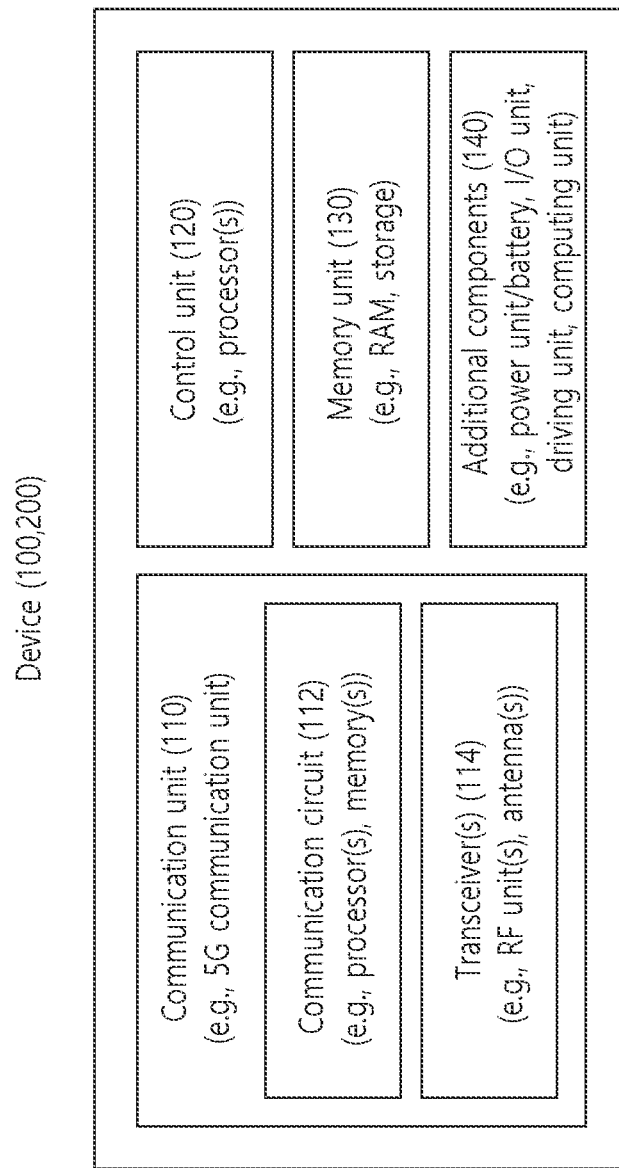
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Dual Connectivity (DC)>

Recently, a scheme for simultaneously connecting UE to different base stations, for example, a macro cell base station and a small cell base station, is being studied. This called dual connectivity (DC).

For example, when DC is configured in E-UTRA, the following exemplary description may be applied.

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Operating Band in NR>

An operating band shown in Table 3 is a reframing operating band that is transitioned from an operating band of LTE/LTE-A. This operating band is referred to as FR1 band.

TABLE 3

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24 | 1626.5 MHz-1660.5 MHz | 1525 MHz-1559 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |
| n97 | 2300 MHz-2400 MHz | N/A | SUL |
| n98 | 1880 MHz-1920 MHz | N/A | SUL |
| n99 | 1626.5 MHz-1660.5 MHz | N/A | SUL |

The following table shows an NR operating band defined at high frequencies. This operating band is referred to as FR2 band.

TABLE 4

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |

Meanwhile, when the operating band shown in the above table is used, a channel bandwidth is used as shown in the following table. For example, Table 5 shows an example of a maximum value of the cannel bandwidth.

TABLE 5

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

In the above table, SCS indicates a subcarrier spacing. In the above table, NRB indicates the number of RBs.

Meanwhile, when the operating band shown in the above Table 4 is used, a channel bandwidth is used as shown in the following Table 6.

TABLE 6

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N/A |
| 120 | 32 | 66 | 132 | 264 |

In NR, E-UTRA (Evolved Universal Terrestrial Radio Access) operating bands may also be used for communication. E-UTRA operating bands may mean operating bands of LTE.

<Disclosure of the Present Specification>

Herein, the power class of UE may mean the maximum allowed output power of the all types of device including handheld device UE in FR1 frequency range. Specially, in FR2, the multiple power class according to device type are defined, such as handheld UE (Power class 3), FWA UE (power class 1) and vehicular UE (power class2) as follow.

Table 7 shows an example of UE power class based on device types in FR2.

TABLE 7

| UE Power class | UE type |
|---|---|
| 1 | Fixed wireless access (FWA) UE |
| 2 | Vehicular UE |
| 3 | Handheld UE |
| 4 | High power non-handheld UE |
| 5 | Fixed wireless access (FWA) UE |

However, in FR1 range, the power class shall be distinguished by the maximum allowed power levels in all device type. Then, the power class 2 UE can support maximum output power up to 26 dBm. The power class 3 UE can support maximum output power up to 23 dBm as follow.

Table 8 shows an example of UE power class in FR1

TABLE 8

| NR band | Class 1 (dBm) | Tolerance (dB) | Class 1.5 (dBm) | Tolerance (dB) | Class 2 (dBm) | Tolerance (dB) | Class 3 (dBm) | Tolerance (dB) |
|---|---|---|---|---|---|---|---|---|
| n1 | | | | | | | 23 | ±31 |
| n2 | | | | | | | 23 | ±33 |
| n3 | | | | | | | 23 | ±33 |
| n5 | | | | | | | 23 | ±3 |
| n7 | | | | | | | 23 | ±33 |
| n8 | | | | | | | 23 | ±33 |
| n12 | | | | | | | 23 | ±33 |
| n13 | | | | | | | 23 | ±3 |
| n14 | 31 | +2/−3 | | | | | 23 | ±3 |
| n18 | | | | | | | 23 | ±38− |
| n20 | | | | | | | 23 | ±33 |
| n24 | | | | | | | 23 | +2/−3 |
| n25 | | | | | | | 23 | ±33 |

TABLE 8-continued

| NR band | Class 1 (dBm) | Tolerance (dB) | Class 1.5 (dBm) | Tolerance (dB) | Class 2 (dBm) | Tolerance (dB) | Class 3 (dBm) | Tolerance (dB) |
|---|---|---|---|---|---|---|---|---|
| n26 | | | | | | | 23 | ±33 |
| n28 | | | | | | | 23 | +2/−2.5 |
| n30 | | | | | | | 23 | ±3 |
| n34 | | | | | | | 23 | ±3 |
| n38 | | | | | | | 23 | ±3 |
| n39 | | | | | | | 23 | ±3 |
| n40 | | | | | 26 | +2/−3 | 23 | ±3 |
| n41 | | | 29 | +2/−3 | 26 | +2/−3 | 23 | ±33 |
| n47 | | | | | | | 23 | ±3 |
| n48 | | | | | | | 23 | +2/−3 |
| n50 | | | | | | | 23 | ±3 |
| n51 | | | | | | | 23 | ±3 |
| n53 | | | | | | | 23 | ±3 |
| n65 | | | | | | | 23 | ±3 |
| n66 | | | | | | | 23 | ±3 |
| n70 | | | | | | | 23 | ±3 |
| n71 | | | | | | | 23 | +2/−2.5 |
| n74 | | | | | | | 23 | ±34 |
| n77 | | | 29 | +2/−3 | 26 | +2/−3 | 23 | +2/−3 |
| n78 | | | 29 | +2/−3 | 26 | +2/−3 | 23 | +2/−3 |
| n79 | | | 29 | +2/−3 | 26 | +2/−3 | 23 | +2/−3 |
| . . . | | | | | | | | |

Conventionally, for power class 2 User Equipment (UE), the impact of self-interference on FDD band has not been analyzed.

Power Class2 RF requirements for NR FDD band is being discussed.

For the NR FDD band, only the Power class3 RF requirements existed. Therefore, it is necessary to analyze the requirements and develop technology in the Power Class2 band.

For example, the conventional FDD terminal (e.g. UE performing communication based on FDD bands) supports only Power class 3. However, recently, a discussion has begun on a Power Class2 FDD terminal with a 3 dB increase in transmit output compared to an existing Power class3 FDD terminal.

The power class 2 FDD terminal may transmit with an output 3 dB higher than that of the existing terminal. In this case, greater interference than the case of the conventional power class 3 terminal may come in the terminal's own reception frequency band. Therefore, it is necessary to analyze the interference effect on it. And, this amount of interference must be allowed so that the terminal can operate in the actual field.

Therefore, it is necessary to analyze the effect on self-reception sensitivity to an interference signal with MSD and define requirements that allow it The disclosure of the present specification describes an example of an RF architecture for High Power UE (HPUE) Power Class2 in the NR FDD band. And, the disclosure of the present specification describes the UE RF requirement and MSD (Maximum Sensitivity Degradation) based on the example of this RF architecture.

UE RF requirements for High power UE (power class 2) for NR FDD band needs to be discussed The following drawings are prepared to explain a specific example of the present specification. Since the names of specific devices or names of specific signals/messages/fields described in the drawings are provided by way of example, technical features of the present specification are not limited to specific names used in the following drawings.

Figure 4:
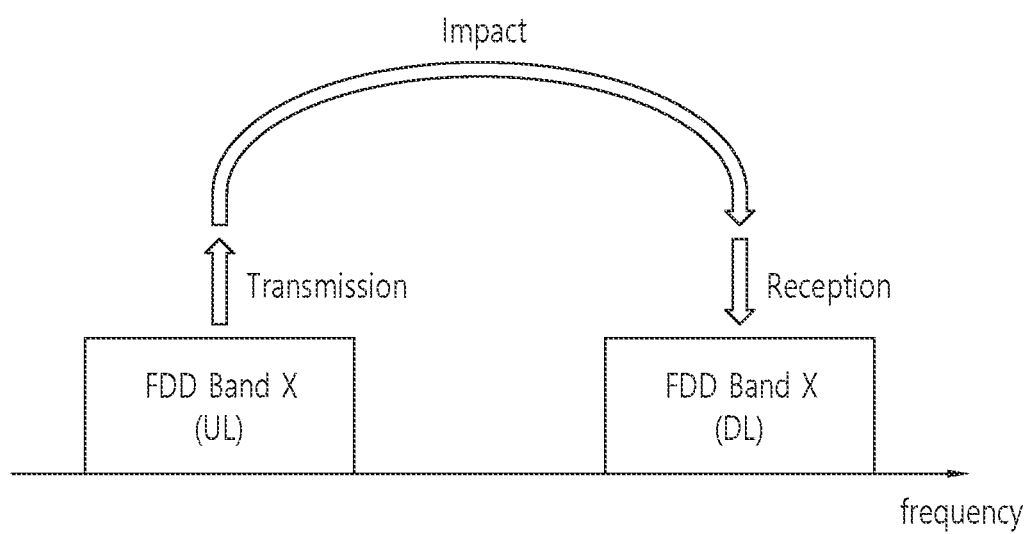
FIG. 4 illustrates an example of situation in which an uplink signal transmitted via an uplink operating band affects reception of a downlink signal on via downlink operating band.

FIG. 4 illustrates an example of situation in which an uplink signal transmitted via an uplink operating band affects reception of a downlink signal on via downlink operating band.

In FIG. 4, the UE is configured to perform communication based on NR FDD band X. Transmission based on Uplink (UL) band of FDD band X may cause impact to Reception based on Downlink (DL) band of FDD band X.

In a case that the UE is power class 2 UE, power boosting of 3 dB may cause non-linearity in the RF component (e.g. duplexer) of the UE. Thus, leakage component from transmission affects reception.

The UE should be configured to satisfy a reference sensitivity power level (REFSENS) which is the minimum average power for each antenna port of the UE when receiving the downlink signal.

When the impact occur as shown in the example of FIG. 4, there is a possibility that the REFSENS for the downlink signal may not be satisfied due to the uplink signal transmitted by the UE itself.

For example, the REFSENS may be set such that the downlink signal throughput of the UE is 95% or more of the maximum throughput of the reference measurement channel. When the impact occurs, there is a possibility that the downlink signal throughput is reduced to 95% or less of the maximum throughput.

Therefore, the impact on Rx band is analyzed in the present disclosure, and the maximum sensitivity degradation (MSD) value may be defined for the corresponding frequency band, so relaxation for REFSENS in the reception band related to its own transmission signal may be allowed. Here, the MSD may mean the maximum allowed reduction of the REFSENS. When the MSD is defined for a specific operating band of the UE, the REFSENS of the corresponding operating band may be relaxed by the amount of the defined MSD.

Hereinafter, in examples of the disclosure of the present specification, self desense and/or self-interference due to uplink transmission in FDD band are analyzed, and a relaxed standard for sensitivity thereto is proposed. For example, the relaxed standard for sensitivity may be based on MSD.

Figure 5:
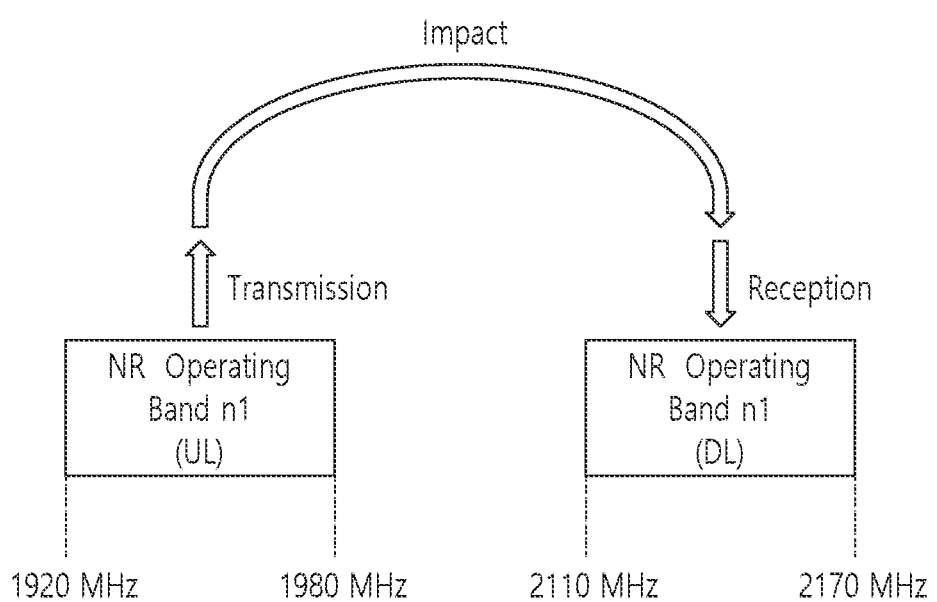
FIG. 5 illustrates an example of situation in which an uplink signal transmitted affects reception of a downlink signal for NR operating band n1.
Figure 6:
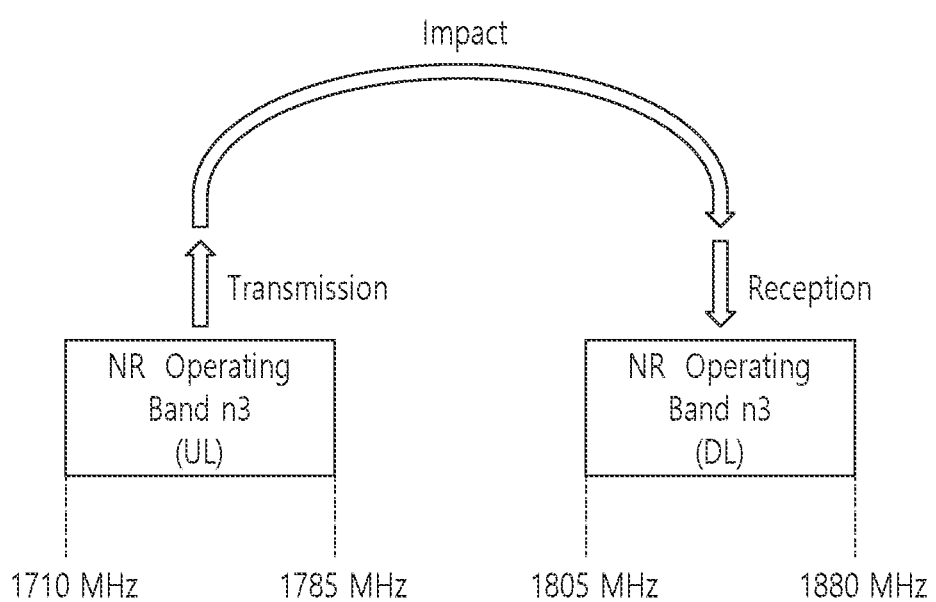
FIG. 6 illustrates an example of situation in which an uplink signal transmitted affects reception of a downlink signal for NR operating band n3.

In various examples of the present disclosure, self desense and/or self-interference due to uplink transmission in FDD band, such as NR operating band n1 and/or n3, are analyzed. FIG. 5 shows an example related to NR operating band n1 and FIG. 6 shows an example related to NR operating band n3.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 5 illustrates an example of situation in which an uplink signal transmitted affects reception of a downlink signal for nr operating band n1.

In FIG. 5, the UE is configured to perform communication based on NR FDD band n1. Transmission based on Uplink (UL) band of FDD band n1 may cause impact to Reception based on Downlink (DL) band of FDD band n1.

In a case that the UE is power class 2 UE, power boosting of 3 dB may cause non-linearity in the RF component (e.g. duplexer) of the UE. Thus, leakage component from transmission affects reception.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 6 illustrates an example of situation in which an uplink signal transmitted affects reception of a downlink signal for NR operating band n3.

In FIG. 6, the UE is configured to perform communication based on NR FDD band n1. Transmission based on Uplink (UL) band of FDD band n3 may cause impact to Reception based on Downlink (DL) band of FDD band n3.

In a case that the UE is power class 2 UE, power boosting of 3 dB may cause non-linearity in the RF component (e.g. duplexer) of the UE. Thus, leakage component from transmission affects reception.

In the disclosure of the present specification, receiver sensitivity for PC2 UE in FDD band (e.g. bands n1 and/or n3) may be analyzed in detail.

In the disclosure of the present specification, some consideration points to specify the detailed UE RF requirements and some proposals may be described.

Examples of considerations for FDD PC2 UE RF requirements may be described.

The analysis was focused on UE 2Tx Architecture for High power UE (power class 2) of NR FDD band. Because the existing RF components (e.g. PC3 PA/duplexer) may be reused for PC2 FDD UE, since it may be premature to find a suitable PA/Duplexer for PC2 FDD UE with high linearity performance in FDD band. For the PC2 RF components, it may be possible when the reasonable PA/duplexer and other RF components shall be introduced at least 2 RF component manufacturers to achieve the RF component reliability.

First example of Observation: For PC2 FDD UE, it is premature to find a suitable PA/Duplexer for PC2 FDD UE with high linearity performance in FDD band.

Based on the above First example of Observation, 2Tx (2×23 dBm) architecture may be feasible. Existing RF components may be reused for implementing RF architecture for PC3. Also, PC2 Tx diversity UE RF architecture with Dual Tx/PA Architecture can be reused to derive UE RF requirements.

Figure 7:
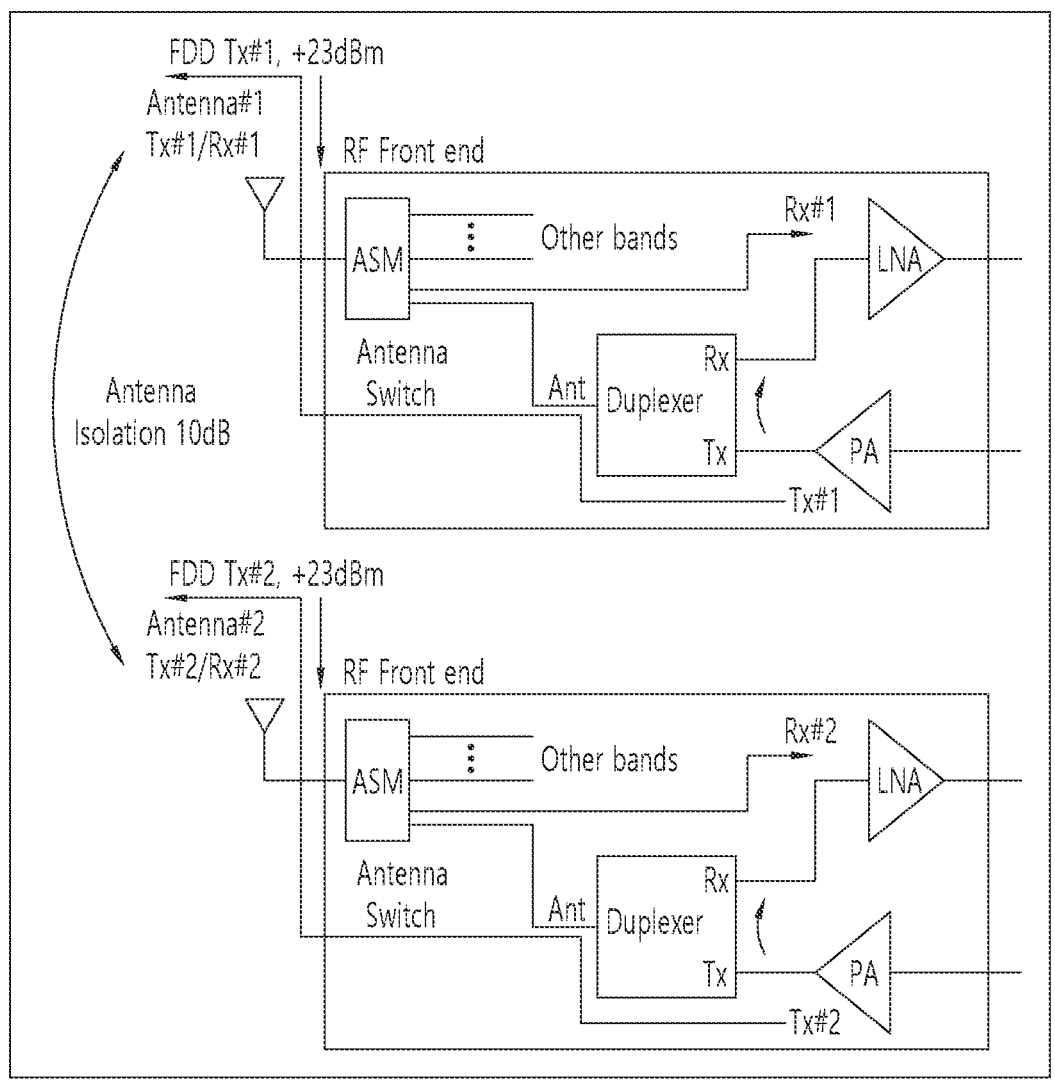
FIG. 7 illustrates a first example of RF architecture for PC2 FDD UE according to an embodiment of the present disclosure.
Figure 8:
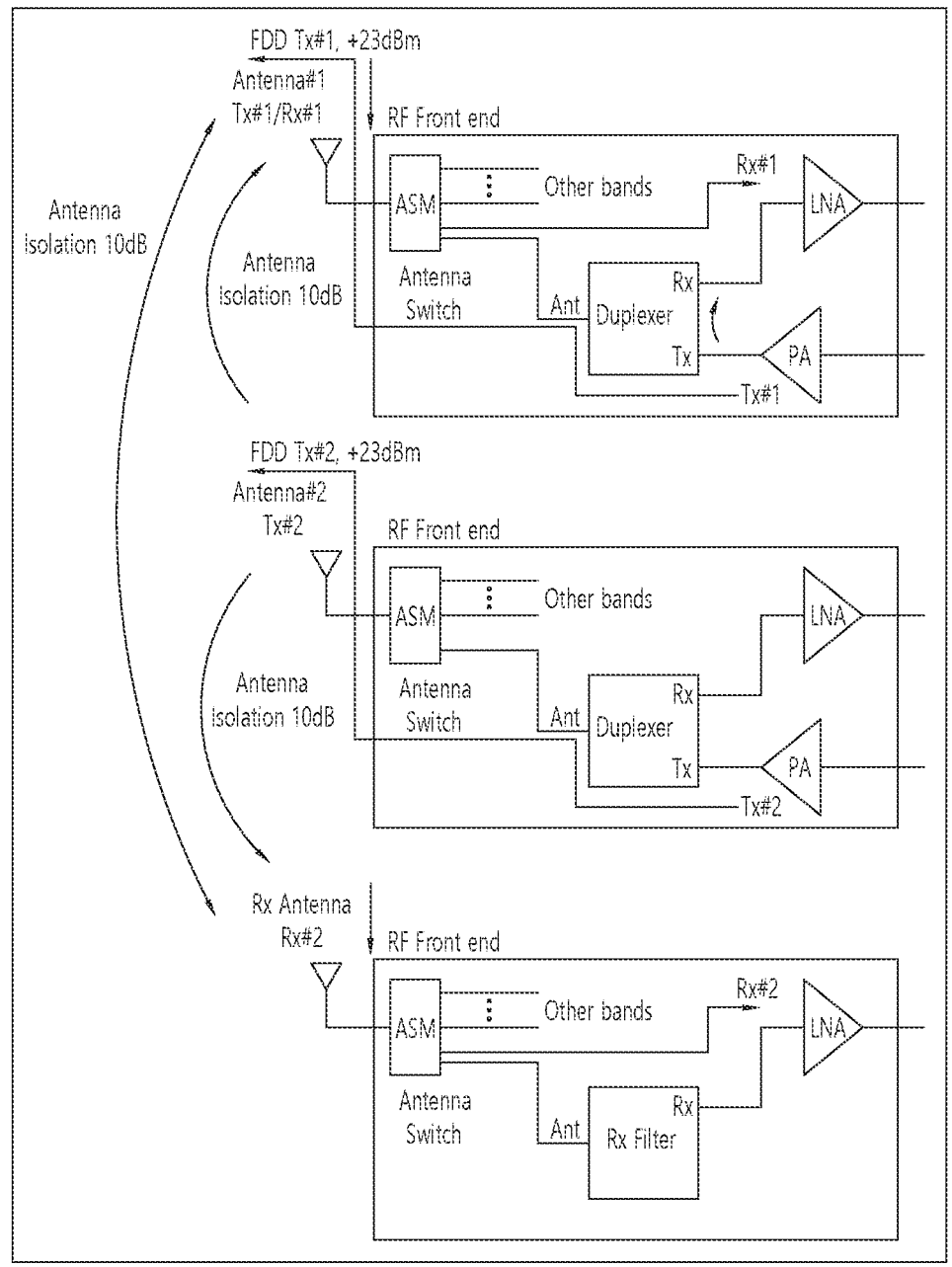
FIG. 8 illustrates a second example of RF architecture for PC2 FDD UE according to an embodiment of the present disclosure.

First example of Proposal: 2PA (2×23 dBm) 2Tx architecture may be considered for the PC2 FDD UE, as shown in examples in FIG. 7 and FIG. 8.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 7 illustrates a first example of RF architecture for PC2 FDD UE according to an embodiment of the present disclosure.

The example of FIG. 7 shows two antennas with antenna isolation of 10 dB. Antenna #1 and Antenna #2 may have maximum transmission power of 23 dBm respectively.

LNA may mean Low Noise Amplifier. ASM may mean Antenna Switch Module.

For example, transmission performed by RF Front end with Antenna #1 may affect reception performed by the same RF Front end. Furthermore, Rx band noise level of each Antenna #1 and Antenna #2 may affect to each other by being attenuated by antenna isolation of 10 dB.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 8 illustrates a second example of RF architecture for PC2 FDD UE according to an embodiment of the present disclosure.

The example of FIG. 8 shows three antennas with antenna isolation of 10 dB. Antenna #1 and Antenna #2 may have maximum transmission power of 23 dBm respectively.

LNA may mean Low Noise Amplifier. ASM may mean Antenna Switch Module.

For example, transmission performed by RF Front end with Antenna #1 may affect reception performed by the same RF Front end.

Based on the above 2Tx (2×23 dBm) architecture, the following may be proposed:

Second example of Proposal: Based on the above example of FIG. 7 and FIG. 8, the PC2 FDD UE RF requirements (e.g. MPR, MSD V) may be analyzed.

For the Maximum Power Reduction (MPR) requirements, the detailed MPR values with 2Tx/2PA for TxD UE was conventionally discussed. The required MPR requirements of PC2 TxD UE for PC2 FDD UE may be reused. Based on the above observation, the following may be proposed:

Third example of Proposal: The conventional MPR requirements of PC2 TxD (2×23 dBm) UE may be reused for the PC2 FDD MPR requirements.

The following analysis was done based for the receiver sensitivity Degradation for 2Tx (2×23 dBm) architecture #A (FIG. 7) of FDD PC2

In Table 9, the RF component characteristics according to each NR band are summarized.

TABLE 9

| parameters | NR n1 band | NR n3 band |
|---|---|---|
| Total NF (dB) | 9 | 9 |
| RFIC Noise for Rx band (dBm/Hz) | −153 | −150 |
| PA Noise for Rx band (dBm/Hz) | −125 | −122 |
| PA Gain for Rx band (dB) | 28 | 28 |
| Duplexer Tx/Rx isolation (dB) | 53 | 47 |
| RF Front-End Loss (dB) | 4 | 4 |
| Diversity gain (dB) | 3 | 3 |
| Antenna isolation (dB) | 10 | 10 |
| Implementation Margin (dB) | 2.5 | 2.5 |

Table 9 shows RF parameters according to each NR band for the first example of RF architecture or the second example of RF architecture. NF may mean noise figure. PA means Power amplifier. RFIC may mean Radio Frequency Integrated Circuits. According to examples of Tables 1021, analysis for the decrease in reception sensitivity may be described, for each of NR channel bandwidth of 5/10/15/20/25/30/35/40/45/50 MHz, according to the first example of RF architecture for FDD PC2 2Tx (2×23 dBm) shown in FIG. 7.

According to the first example of RF architecture shown in FIG. 7, PC2 2Tx (2×23 dBm) operation may be performed based on Dual Tx. For both Tx1 and Tx2, each transmit and receive with the same antenna (e.g. antenna #1 and antenna #2 respectively), self-interference may also be applied.

In addition, the Rx band noise level generated by each antenna (#1, #2) may flow into other antennas by being attenuated by 10 dB of antenna isolation, and coupling noise may be added. Here, the Rx band noise level may mean a noise component generated in the PA and the RFIC.

Table 10 to Table 19 shows examples of REFSENS reference for FDD PC2 UE in each NR band according to channel Bandwidth (ch BW or CBW) shown in each table. Table 10 to Table 19 shows examples of analysis result based on above mentioned descriptions, tables, observations.

TABLE 10

| NR n3 band | NR n3 band | | NR n1 band | |
|---|---|---|---|---|
| | Rx1 path | Rx2 path | Rx1 path | Rx2 path |
| ch BW [MHz] | 5 | 5 | 5 | 5 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −162.5 | −162.5 | −171.5 | −171.5 |
| PA RX Band Noise level at Antenna connector (dBm/Hz) | −162.5 | −162.5 | −171.5 | −171.5 |
| Total RXBN at Antenna connector (dBm/Hz) | −158.1 | −158.1 | −163.3 | −163.3 |
| Sensitivity with RXBN (PC3 max Tx power)(dBm) *5 MHz BW | −92.1 | −92.1 | −97.3 | −97.3 |
| REFSENS After MRC (dBm) | −95.1 | | −100.3 | |
| 3GPP PC3 REFSENS(2Rx) *5 MHz BW (dBm) | −97.0 | | −100 | |
| Desense due to FDD PC2 (dB). MSD (dB) | 1.9 | | 0 | |

Table 10 shows an example of REFSENS and desense value due to FDD PC2 operation for 5 MHz CBW.

Refer to Table 10, C/N(Carrier to Noise) may indicate the intensity of noise level compared to a signal (e.g. carrier) to be received. C/N requirement of −1 dB means a capability of receiving signal (e.g. carrier), when the received signal (e.g. carrier) is −1 dB smaller than noise level.

RFFE (RF Front End) may mean uppermost block of RF Radio. RFFE may mean RF components between RFIC and Antenna. For example, RFFE may include PA, LNA, Duplexer etc.

IL (Insertion loss) may mean loss term of RF components. RFFE IL is RF Front End Insertion loss.

NF (Noise Figure) may mean how much noise is added as a signal passes through a certain system or a certain circuit block. NF can be used to calculate receiving sensitivity and MSD (maximum sensitivity Degradation).

RXBN(Rx band noise) may mean noise level induced by the Rx band.

For example, signal from two PA affects Rx1 and Rx2. For example, Rx1 is affected by two PA, and Rx2 is affected by two PA. Sensitivity for PC2 is calculated based on this assumption as the following:

Sensitivity with RXBN (max Tx power) may be calculated based on Total RXBN at Antenna connector, CBW (ch BW), and target SNR (C/N requirement).

For example, for NR n3 band and for Rx1 path, Sensitivity with RXBN (max Tx power) is equal to summation of Total RXBN at Antenna connector (−158.1)+10 log(5 MHz) (that is, 10 log (5*10^6))+target SNR (C/N requirement, which is equal to −1.00). That is, Sensitivity with RXBN (max Tx power) is equal to −158.1+67−1=−92.1.

For example, Values shown in final column of Table 10 are derived by using MRC for Sensitivity with RXBN (max Tx power) of Rx1 path and Rx2 path.

For example, 3GPP PC3 REFSENS (2Rx)*5 MHz BW (dBm) may be −97 dBm. Thus, Desense due to FDD PC2 (dB), MSD, may be 1.9 dB.

TABLE 11

| NR n3 band | NR n3 band | | NR n1 band | |
|---|---|---|---|---|
|  | Rx1 path | Rx2 path | Rx1 path | Rx2 path |
| ch BW [MHz] | 10 | 10 | 10 | 10 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −162.5 | −162.5 | −171.5 | −171.5 |
| PA RX Band Noise level at Antenna connector (dBm/Hz) | −162.5 | −162.5 | −171.5 | −171.5 |
| Total RXBN at Antenna connector (dBm/Hz) | −158.1 | −158.1 | −163.3 | −163.3 |
| Sensitivity with RXBN (PC3 max Tx power)(dBm) *10 MHz BW | −89.1 | −89.1 | −94.3 | −94.3 |
| REFSENS After MRC (dBm) | −92.1 | | −97.3 | |
| 3GPP PC3 REFSENS(2Rx) *10 MHz BW (dBm) | −93.8 | | −96.8 | |
| Desense due to FDD PC2 (dB). MSD (dB) | 1.7 | | 0 | |

Table 11 shows an example of REFSENS and desense value due to FDD PC2 operation for 10 MHz CBW.

Description mentioned with Table 10 may be applied to Table 11 in a same way.

TABLE 12

| NR n3 band | NR n3 band | | NR n1 band | |
|---|---|---|---|---|
|  | Rx1 path | Rx2 path | Rx1 path | Rx2 path |
| ch BW [MHz] | 15 | 15 | 15 | 15 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −162.5 | −162.5 | −171.5 | −171.5 |
| PA RX Band Noise level at Antenna connector (dBm/Hz) | −162.5 | −162.5 | −171.5 | −171.5 |
| Total RXBN at Antenna connector (dBm/Hz) | −158.1 | −158.1 | −163.3 | −163.3 |
| Sensitivity with RXBN (PC3 max Tx power)(dBm) *15 MHz BW | −87.3 | −87.3 | −92.5 | −92.5 |
| REFSENS After MRC (dBm) | −90.3 | | −95.5 | |
| 3GPP PC3 REFSENS(2Rx) *15 MHz BW (dBm) | −92.0 | | −95.0 | |
| Desense due to FDD PC2 (dB). MSD (dB) | 1.7 | | 0 | |

Table 12 shows an example of REFSENS and desense value due to FDD PC2 operation for 15 MHz CBW.

Description mentioned with Table 10 may be applied to Table 12 in a same way.

TABLE 13

| NR n3 band | NR n3 band | | NR n1 band | |
|---|---|---|---|---|
|  | Rx1 path | Rx2 path | Rx1 path | Rx2 path |
| ch BW [MHz] | 20 | 20 | 20 | 20 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −162.5 | −162.5 | −171.5 | −171.5 |
| PA RX Band Noise level at Antenna connector (dBm/Hz) | −162.5 | −162.5 | −171.5 | −171.5 |
| Total RXBN at Antenna connector (dBm/Hz) | −158.1 | −158.1 | −163.3 | −163.3 |
| Sensitivity with RXBN (PC3 max Tx power)(dBm) *20 MHz BW | −86.1 | −86.1 | −91.3 | −91.3 |

TABLE 13-continued

|  | NR n3 band | | NR n1 band | |
| --- | --- | --- | --- | --- |
| NR n3 band | Rx1 path | Rx2 path | Rx1 path | Rx2 path |
| REFSENS After MRC (dBm) | −89.1 | | −94.3 | |
| 3GPP PC3 REFSENS(2Rx) *20 MHz BW (dBm) | −90.8 | | −93.8 | |
| Desense due to FDD PC2 (dB). MSD (dB) | 1.7 | | 0 | |

Table 13 shows an example of REFSENS and desense value due to FDD PC2 operation for 20 MHz CBW.

Description mentioned with Table 10 may be applied to Table 13 in a same way.

TABLE 14

|  | NR n3 band | | NR n1 band | |
| --- | --- | --- | --- | --- |
| NR n3 band | Rx1 path | Rx2 path | Rx1 path | Rx2 path |
| ch BW [MHz] | 25 | 25 | 25 | 25 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −162.5 | −162.5 | −171.5 | −171.5 |
| PA RX Band Noise level at Antenna connector (dBm/Hz) | −162.5 | −162.5 | −171.5 | −171.5 |
| Total RXBN at Antenna connector (dBm/Hz) | −158.1 | −158.1 | −163.3 | −163.3 |
| Sensitivity with RXBN (PC3 max Tx power)(dBm) *25 MHz BW | −85.1 | −85.1 | −90.3 | −90.3 |
| REFSENS After MRC (dBm) | −88.1 | | −93.3 | |
| 3GPP PC3 REFSENS(2Rx) *25 MHz BW (dBm) | −89.7 | | −92.7 | |
| Desense due to FDD PC2 (dB). MSD (dB) | 1.6 | | 0 | |

Table 14 shows an example of REFSENS and desense value due to FDD PC2 operation for 25 MHz CBW.

Description mentioned with Table 10 may be applied to Table 14 in a same way.

TABLE 15

|  | NR n3 band | | NR n1 band | |
| --- | --- | --- | --- | --- |
| NR n3 band | Rx1 path | Rx2 path | Rx1 path | Rx2 path |
| ch BW [MHz] | 30 | 30 | 30 | 30 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −162.5 | −162.5 | −171.5 | −171.5 |
| PA RX Band Noise level at Antenna connector (dBm/Hz) | −162.5 | −162.5 | −171.5 | −171.5 |
| Total RXBN at Antenna connector (dBm/Hz) | −158.1 | −158.1 | −163.3 | −163.3 |
| Sensitivity with RXBN (PC3 max Tx power)(dBm) *30 MHz BW | −84.3 | −84.3 | −89.5 | −89.5 |
| REFSENS After MRC (dBm) | −87.3 | | −92.5 | |
| 3GPP PC3 REFSENS(2Rx) *30 MHz BW (dBm) | −88.9 | | −91.9 | |
| Desense due to FDD PC2 (dB). MSD (dB) | 1.6 | | 0 | |

Table 15 shows an example of REFSENS and desense value due to FDD PC2 operation for 30 MHz CBW.

Description mentioned with Table 10 may be applied to Table 15 in a same way.

TABLE 16

| NR n3 band | NR n3 band | |
|---|---|---|
| | Rx1 path | Rx2 path |
| ch BW [MHz] | 35 | 35 |
| C/N requirement (dB) | −1.0 | −1.0 |
| Noise floor at Antenna connector(dBm/Hz) | −165.0 | −165.0 |
| Total NF(RFFE IL + RF NF) (dB) | 9.0 | 9.0 |
| RFIC RX Band Noise level at Antenna connector (dBm/Hz) | −159.1 | −159.1 |
| PA RX Band Noise level at Antenna connector (dBm/Hz) | −159.1 | −159.1 |

TABLE 16-continued

| NR n3 band | NR n3 band | |
|---|---|---|
| | Rx1 path | Rx2 path |
| Total RXBN at Antenna connector (dBm/Hz) | −155.2 | −155.2 |
| Sensitivity with RXBN (PC3 max Tx power)(dBm) *35 MHz BW | −80.8 | −80.8 |
| REFSENS After MRC (dBm) | −83.8 | |
| 3GPP PC3 REFSENS(2Rx) *35 MHz BW (dBm) | −86.2 | |
| Desense due to FDD PC2 (dB). MSD (dB) | 2.4 | |

Table 16 shows an example of REFSENS and desense value due to FDD PC2 operation for 35 MHz CBW. 35 MHz CBW is not used for NR n1 band.

Description mentioned with Table 10 may be applied to Table 16 in a same way.

TABLE 17

| NR n3 band | NR n3 band | | NR n1 band | |
|---|---|---|---|---|
| | Rx1 path | Rx2 path | Rx1 path | Rx2 path |
| ch BW [MHz] | 40 | 40 | 40 | 40 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −152.5 | −152.5 | | |
| PA RX Band Noise level at Antenna connector (dBm/Hz) | −162.5 | −162.5 | −171.5 | −171.5 |
| Total RXBN at Antenna connector (dBm/Hz) | −162.5 | −162.5 | −171.5 | −171.5 |
| Sensitivity with RXBN (PC3 max Tx power)(dBm) *40 MHz BW | −151.1 | −151.1 | −163.3 | −163.3 |
| REFSENS After MRC (dBm) | −79.1 | | −91.3 | |
| 3GPP PC3 REFSENS(2Rx) *40 MHz BW (dBm) | −82.3 | | −90.6 | |
| Desense due to FDD PC2 (dB). MSD (dB) | 3.2 | | 0 | |

Table 17 shows an example of REFSENS and desense value due to FDD PC2 operation for 40 MHz CBW.

Description mentioned with Table 10 may be applied to Table 17 in a same way.

TABLE 18

| NR n3 band | NR n3 band | | NR n1 band | |
|---|---|---|---|---|
| | Rx1 path | Rx2 path | Rx1 path | Rx2 path |
| ch BW [MHz] | 45 | 45 | 45 | 45 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −151.7 | −151.7 | | |
| PA RX Band Noise level at Antenna connector (dBm/Hz) | −162.5 | −162.5 | −171.5 | −171.5 |
| Total RXBN at Antenna connector (dBm/Hz) | −162.5 | −162.5 | −171.5 | −171.5 |
| Sensitivity with RXBN (PC3 max Tx power)(dBm) *45 MHz BW | −150.5 | −150.5 | −163.3 | −163.3 |
| REFSENS After MRC (dBm) | −77.9 | | −90.7 | |
| 3GPP PC3 REFSENS(2Rx) *45 MHz BW (dBm) | −81.3 | | −90.1 | |
| Desense due to FDD PC2 (dB). MSD (dB) | 3.4 | | 0 | |

Table 18 shows an example of REFSENS and desense value due to FDD PC2 operation for 45 MHz CBW.

Description mentioned with Table 10 may be applied to Table 18 in a same way.

TABLE 19

| NR n3 band | NR n3 band | | NR n1 band | |
|---|---|---|---|---|
| | Rx1 path | Rx2 path | Rx1 path | Rx2 path |
| ch BW [MHz] | 50 | 50 | 50 | 50 |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| RFIC RX Band Noise level at Antenna connector (dBm/Hz) | −151.6 | −151.6 | | |
| PA RX Band Noise level at Antenna connector (dBm/Hz) | −162.5 | −162.5 | −171.5 | −171.5 |
| Total RXBN at Antenna connector (dBm/Hz) | −162.5 | −162.5 | −171.5 | −171.5 |
| Sensitivity with RXBN (PC3 max Tx power)(dBm) *50 MHz BW | −150.4 | −150.4 | −163.3 | −163.3 |
| REFSENS After MRC (dBm) | −77.4 | | −90.3 | |
| 3GPP PC3 REFSENS(2Rx) *50 MHz BW (dBm) | −81.3 | | −89.6 | |
| Desense due to FDD PC2 (dB). MSD (dB) | 3.9 | | 0 | |

Table 19 shows an example of REFSENS and desense value due to FDD PC2 operation for 50 MHz CBW.

Description mentioned with Table 10 may be applied to Table 19 in a same way.

Fourth example of Proposal: Based on the analysis result, the MSD (Maximum Sensitivity Degradation) level of FDD PC2 according to the RF Architecture may be provided as shown in Table 20, Table 21.

Herein, the MSD may also be called as the maximum amount of degradation for reference sensitivity Table 20 shows an example of MSD (Maximum Sensitivity Degradation) level for FDD PC2 UE in each NR band. For example, the example of the MSD level may be based on first example of RF architecture shown in FIG. 7.

TABLE 20

| Operating Band | 5 MHz (dB) | 10 MHz (dB) | 15 MHz (dB) | 20 MHz (dB) | 25 MHz (dB) | 30 MHz (dB) | 35 MHz (dB) | 40 MHz (dB) | 45 MHz (dB) | 50 MHz (dB) |
|---|---|---|---|---|---|---|---|---|---|---|
| n1 | 0 dB | 0 dB | 0 dB | 0 dB | 0 dB | 0 dB | — | 0 dB | 0 dB | 0 dB |
| n3 | 1.9 dB | 1.7 dB | 1.7 dB | 1.7 dB | 1.6 dB | 1.6 dB | 2.4 dB | 3.2 dB | 3.4 dB | 3.9 dB |

Table 20 shows examples of MSD (Maximum Sensitivity Degradation) level proposed in the present disclosure. The examples of the MSD level in Table 20 may be based on the UE operating based on FDD power class 2 operation.

For reference, ±α tolerance may be applied to the MSD values shown in the present disclosure. For example, α may be 0, 0.1, 0.2, 0.3, 0.4, 0.5, 0.6, 0.7, ... 2.0. That is, the range of MSD values proposed in the present specification may include MSD values to which a tolerance of ±α is applied. The tolerance value may be determined in a unit of 0.1 dB differences according to characteristics of RF components.

In NR FDD band n1, when the UE performs communication based on FDD Power class2, reception sensitivity degradation may not occur. However, when the UE performs communication based on FDD Power class2 in NR FDD band n3, as shown in Table 20, reception sensitivity degradation occurs.

On the other hand, a second example of RF architecture shown in FIG. 8 may be a structure in which the secondary antenna is separated from the Tx antenna. Therefore, after the Rx band noise component generated in the Tx1 and Tx2 antennas is attenuated by 10 dB due to antenna isolation, it may be received by the Rx antenna (Rx #2). Accordingly, in this case, it may be possible to improve the reception sensitivity.

Table 21 shows an example of MSD (Maximum Sensitivity Degradation) level for FDD PC2 UE in each NR band. For example, the example of the MSD level may be based on the second example of RF architecture shown in FIG. 8.

TABLE 21

| Operating Band | 5 MHz (dB) | 10 MHz (dB) | 15 MHz (dB) | 20 MHz (dB) | 25 MHz (dB) | 30 MHz (dB) | 35 MHz (dB) | 40 MHz (dB) | 45 MHz (dB) | 50 MHz (dB) |
|---|---|---|---|---|---|---|---|---|---|---|
| n1 | 0 dB | 0 dB | 0 dB | 0 dB | 0 dB | 0 dB | — | 0 dB | 0 dB | 0 dB |
| n3 | 1.0 dB | 0 dB | 0 dB | 0 dB | 0 dB | 0 dB | 0 dB | 0 dB | 0 dB | 0 dB |

For reference, ±α tolerance may be applied to the MSD values shown in the present disclosure. For example, α may be 0, 0.1, 0.2, 0.3, 0.4, 0.5, 0.6, 0.7, . . . 2.0. That is, the range of MSD values proposed in the present specification may include MSD values to which a tolerance of ±α is applied. The tolerance value may be determined in a unit of 0.1 dB differences according to characteristics of RF components. Table 21 shows examples of MSD (Maximum Sensitivity Degradation) level proposed in the present disclosure. The examples of the MSD level in Table 21 may be based on the UE operating based on FDD power class 2 operation.

When a second example of RF architecture shown in FIG. 8 is applied, the MSD (Maximum Sensitivity Degradation) level is as in the example in Table 21. Even when the UE performs communication based on FDD PC2 in the n3 band, reception sensitivity does not deteriorate in all channel BWs except 5M channel BW (MSD=1 dB).

In the specification aspect, the first example of RF architecture may be the worst case to support PC2 FDD UE. That is, the first example of RF architecture may be the reference to specify the MSD requirements. The present disclosure proposes the examples of the MSD requirements in Table 21 for RF requirements.

The Fifth Example of Proposal: Based on the examples of the analysis result, the MSD (Maximum Sensitivity Degradation) level of FDD PC2 may be specified as Table 20 considering the first example of RF architecture.

According to an embodiment of the present disclosure, considerations on UE RF requirements for High power UE (power class 2) for NR FDD band may be applied.

In summary, the present disclosure explained observation for High power UE (power class 2) of NR FDD band First example of Observation: For PC2 FDD UE, it is premature to find a suitable PA/Duplexer for PC2 FDD UE with high linearity performance in FDD band.

Based on the above observation, the present disclosure proposed the following examples of proposal:

First example of Proposal: 2PA (2×23 dBm) 2Tx architecture may be considered for the PC2 FDD UE, as shown in examples in FIG. 7 and FIG. 8 for the PC2 FDD UE.

Second example of Proposal: Based on the above example of FIG. 7 and FIG. 8, the PC2 FDD UE RF requirements (e.g. MPR, MSD) may be analyzed.

For the Maximum Power Reduction (MPR) requirements, the detailed MPR values with 2Tx/2PA for TxD UE was conventionally discussed. The required MPR requirements of PC2 TxD UE for PC2 FDD UE may be reused. Based on the above observation, the following may be proposed:

Third example of Proposal: The conventional MPR requirements of PC2 TxD (2×23 dBm) UE may be reused for the PC2 FDD MPR requirements.

Proposal 4: Based on the analysis result, the MSD (Maximum Sensitivity Degradation) level of FDD PC2 according to the RF Architecture may be provided as shown in Table 20, Table 21.

Proposal 5: Based on the examples of the analysis result, the MSD (Maximum Sensitivity Degradation) level of FDD PC2 may be specified as Table 20 considering the first example of RF architecture.

The following drawings are prepared to explain a specific example of the present specification. Since the names of specific devices or names of specific signals/messages/fields described in the drawings are provided by way of example, technical features of the present specification are not limited to specific names used in the following drawings.

Figure 9:
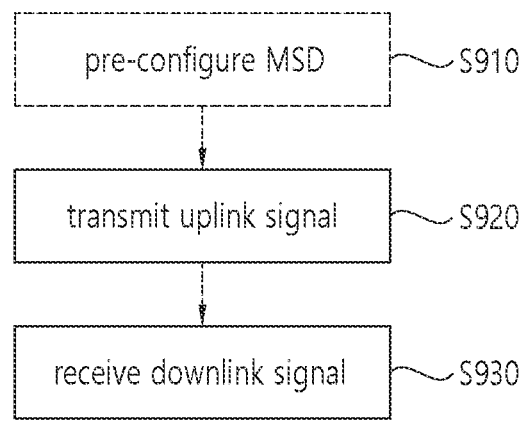
FIG. 9 is a flow chart showing an example of a procedure of a UE according to the present disclosure.

FIG. 9 is a Flow Chart Showing an Example of a Procedure of a UE According to the Present Disclosure.

Referring to FIG. 9, steps S910 to S930 are shown. Operations described below may be performed by the UE (for example, the first device 100 of FIG. 2).

For reference, step S910 may not always be performed when the UE performs communication. For example, step S910 may be performed only when the reception performance of the UE is tested.

For the UE performing the operation of FIG. 9, NR operating band n1 and/or n3 may be configured for communication. The UE may be a PC2 UE. The UE may support Tx diversity. The UE may support 2PA (2*23 dBm) RF architecture for the power class 2.

In step S910, the UE may preconfigure the MSD value. For example, the UE may preset the MSD values according to Table 10 to Table 21.

In step S920, the UE may transmit the uplink signal.

In step S930, the UE may receive the downlink signal.

The UE may receive the downlink signal based on the reference sensitivity of the downlink band, to which the MSD value (for example, MSD values shown in examples of to Table 10 to Table 21) is applied. For example, predetermined value of MSD is applied to a reference sensitivity used for the receiving of the downlink signal.

For example, based on that the UE is the PC2 UE and the NR operating band n3 is used for the uplink signal and the downlink signal, wherein the predetermined value of the maximum amount of degradation is equal to: 1.6 dB, based on that channel bandwidth for the downlink signal is 25 MHz.

For example, based on that the UE is the PC2 UE and the NR operating band n3 is used for the uplink signal and the downlink signal, wherein the predetermined value of the maximum amount of degradation is equal to: 1.4 dB, based on that channel bandwidth for the downlink signal is 5 MHz, 1.5 dB, based on that channel bandwidth for the downlink signal is 10 MHz, 1.5 dB, based on that channel bandwidth for the downlink signal is 15 MHz, 1.5 dB, based on that channel bandwidth for the downlink signal is 20 MHz, 1.7 dB, based on that channel bandwidth for the downlink signal is 30 MHz, and 2.8 dB, based on that channel bandwidth for the downlink signal is 35 MHz.

For example, based on that the UE is the PC2 UE and the NR operating band n3 is used for the uplink signal and the downlink signal, wherein the predetermined value of the maximum amount of degradation is equal to: 5 dB, based on that channel bandwidth for the downlink signal is 40 MHz.

For example, based on that the UE is the PC2 UE and the NR operating band n1 is used for the uplink signal and the downlink signal, wherein the predetermined value of the maximum amount of degradation is equal to: 0 dB, based on that channel bandwidth for the downlink signal is 5 MHz, 10 MHz, 15 MHz, 20 MHz, 25 MHz, 30 MHz, 40 MHz, 45 MHz, or 50 MHz.

For reference, the order in which steps S920 and S930 are performed may be different from that shown in FIG. 9. For example, step S930 may be performed first and then step S920 may be performed. Alternatively, step S920 and step S930 may be performed simultaneously. Alternatively, the time when step S920 and step S930 may be may overlap partially.

Hereinafter, an apparatus (for example, UE) in a wireless communication system, according to some embodiments of the present disclosure, will be described.

For example, the apparatus may include at least one processor, at least one transceiver, and at least one computer memory.

For example, the at least one computer memory operably connectable to the at least one processor and storing instructions that, based on being executed by the at least one processor, perform operations comprising: transmitting an uplink signal based on NR operating band n3, which is FDD band, wherein the UE is a power class 2 (PC2) UE supporting 26 dBm of maximum output power; and receiving a downlink signal based on the NR operating band n3, wherein a predetermined value of maximum amount of degradation is applied to a reference sensitivity used for the receiving of the downlink signal, and based on that the UE is the PC2 UE and the NR operating band n3 is used for the uplink signal and the downlink signal, wherein the predetermined value of the maximum amount of degradation is equal to: 1.6 dB, based on that channel bandwidth for the downlink signal is 25 MHz.

Hereinafter, a processor for in a wireless communication system, according to some embodiments of the present disclosure, will be described.

The processor may be configured to perform operations comprising: transmitting an uplink signal based on NR operating band n3, which is FDD band, wherein the UE is a power class 2 (PC2) UE supporting 26 dBm of maximum output power; and receiving a downlink signal based on the NR operating band n3, wherein a predetermined value of maximum amount of degradation is applied to a reference sensitivity used for the receiving of the downlink signal, and based on that the UE is the PC2 UE and the NR operating band n3 is used for the uplink signal and the downlink signal, wherein the predetermined value of the maximum amount of degradation is equal to: 1.6 dB, based on that channel bandwidth for the downlink signal is 25 MHz.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE.

For example, the stored a plurality of instructions may cause the UE to perform operations comprising: generating an uplink signal based on NR operating band n3, which is FDD band, wherein the UE is a power class 2 (PC2) UE supporting 26 dBm of maximum output power; and obtaining a downlink signal based on the NR operating band n3, wherein a predetermined value of maximum amount of degradation is applied to a reference sensitivity used for the receiving of the downlink signal, and based on that the UE is the PC2 UE and the NR operating band n3 is used for the uplink signal and the downlink signal, wherein the predetermined value of the maximum amount of degradation is equal to: 1.6 dB, based on that channel bandwidth for the downlink signal is 25 MHz.

According to some embodiment of the present disclosure, the PC2 UE may efficiently and/or precisely perform communication based on FDD operating bands. For example, the impact of self interference on FDD band for PC2 UE is analyzed. Also, the degree of reception sensitivity relaxation in the case where desensing occurs is analyzed. Also, interference due to Tx diversity (e.g. 2Tx structure) is analyzed. Also, MSD values applied to reference sensitivity for receiving the downlink signal are clearly determined.

According to an embodiment of the disclosure of the present specification, the FDD terminal may have a dual PA 2-Tx architecture. For example, it is possible to analyze the influence of interference caused by the power class2 transmit power in this architecture on the self-receiving sensitivity at the self-receiving frequency. And, it is possible to define a standard that allows the influence of such interference.

According to an embodiment of the disclosure of the present specification, a PC2 FDD terminal in the Dual PA 2-Tx architecture can transmit a signal with 3 dB higher transmission power than a conventional PC3 FDD terminal. For such a PC2 FDD terminal, it is possible to define an MSD that allows the relaxation of the reception sensitivity of the reception band according to the occurrence of self interference in the self reception frequency. In order to define this MSD, a standard specification can be defined. And, according to the example of the disclosure of the present specification, a PC2 FDD support terminal supporting Dual PA 2-Tx architecture may be supported.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A User Equipment (UE) comprising:
   at least one transceiver;
   at least one processor; and
   at least one computer memory operably connectable to the at least one processor and storing instructions,
   wherein the at least one processor is adapted to:
   transmit an uplink signal based on New Radio (NR) operating band n3, which is Frequency Division Duplexing (FDD) band,
   wherein the UE is a power class 2 (PC2) UE based on 26 dBm of maximum output power; and
   receive a downlink signal based on the NR operating band n3,
   wherein the UE supports transmission (Tx) diversity,
   wherein a value of maximum amount of degradation is allowed for a reference sensitivity, and
   based on that the UE is the PC2 UE and the UE supports the Tx diversity, wherein the value of the allowed maximum amount of degradation for the NR operating band n3 is equal to:
   1.6 dB, based on that channel bandwidth is 25 MHz.

2. The UE of claim 1,
   wherein the value of the maximum amount of degradation is allowed, based on that the UE is the PC2 UE, based on that the NR operating band n3 is used for the uplink signal and the downlink signal, and based on that the UE supports Transmission (Tx) Diversity.

3. The UE of claim 1,
   based on that the UE is the PC2 UE and the NR operating band n3 is used for the uplink signal and the downlink signal, wherein the value of the allowed maximum amount of degradation is equal to:
   1.4 dB, based on that channel bandwidth is 5 MHz,
   1.5 dB, based on that channel bandwidth is 10 MHz,
   1.5 dB, based on that channel bandwidth is 15 MHz,
   1.5 dB, based on that channel bandwidth is 20 MHz,
   1.7 dB, based on that channel bandwidth is 30 MHz, and
   2.8 dB, based on that channel bandwidth is 35 MHz.

4. The UE of claim 1,
   based on that the UE is the PC2 UE and the NR operating band n3 is used for the uplink signal and the downlink signal, wherein the value of the allowed maximum amount of degradation is equal to:
   5 dB, based on that channel bandwidth is 40 MHz.

5. The UE of claim 1, wherein the at least one processor is further adapted to:
   transmit the uplink signal based on NR operating band n1, which is FDD band, and
   receive the downlink signal is received based on the NR operating band n1.

6. The UE of claim 5,
   based on that the UE is the PC2 UE and the NR operating band n1 is used for the uplink signal and the downlink signal, wherein the value of the allowed maximum amount of degradation is equal to:
   0 dB, based on that channel bandwidth is 5 MHz, 10 MHz, 15 MHz, 20 MHz, 25 MHz, 30 MHz, 40 MHz, 45 MHz, or 50 MHz.

7. The UE of claim 1,
   wherein the NR operating band n3 includes uplink band with frequency range of 1710 MHz to 1785 MHz and downlink band with frequency range of 1805 MHz to 1880 MHz.

8. The UE of claim 5,
   wherein the NR operating band n1 includes uplink band with frequency range of 1920 MHz to 1980 MHz and downlink band with frequency range of 2110 MHz to 2170 MHz.

9. The UE of claim 1,
   wherein the UE is an autonomous driving device that communicates with at least one of a mobile terminal, a network, and an autonomous vehicle other than the UE.

10. A method comprising:
    transmitting an uplink signal based on New Radio (NR) operating band n3, which is Frequency Division Duplexing (FDD) band,
    wherein a User Equipment (UE) is a power class 2 (PC2) UE based on 26 dBm of maximum output power; and
    receiving a downlink signal based on the NR operating band n3,
    wherein the UE supports transmission (Tx) diversity,
    wherein a value of maximum amount of degradation is allowed for a reference sensitivity, and
    based on that the UE is the PC2 UE and the NR operating band n3 is used for the uplink signal and the downlink signal, wherein the value of the allowed maximum amount of degradation is equal to:
    1.6 dB, based on that channel bandwidth is 25 MHz.

11. A device comprising:
    at least one processor; and
    at least one computer memory operably connectable to the at least one processor and storing instructions,
    wherein the at least one processor is adapted to:
    generate an uplink signal based on New Radio (NR) operating band n3, which is Frequency Division Duplexing (FDD) band,
    wherein the device is a power class 2 (PC2) UE based on 26 dBm of maximum output power; and obtain a downlink signal based on the NR operating band n3,
wherein the UE supports transmission (Tx) diversity,
wherein a value of maximum amount of degradation is allowed for a reference sensitivity, and
based on that the UE is the PC2 UE and the UE supports the Tx diversity, wherein the value of the allowed maximum amount of degradation for the NR operating band n3 is equal to:
1.6 dB, based on that channel bandwidth is 25 MHz.

* * * * *